(12) United States Patent
Schöndube et al.

(10) Patent No.: US 11,624,694 B2
(45) Date of Patent: Apr. 11, 2023

(54) METHOD FOR EXAMINING A LIQUID WHICH CONTAINS AT LEAST ONE CELL AND/OR AT LEAST ONE PARTICLE

(71) Applicant: cytena GmbH, Freiburg (DE)

(72) Inventors: Jonas Schöndube, Freiburg (DE); Lena Lautscham, Freiburg (DE)

(73) Assignee: cytena GmbH, Freiburg (DE)

( * ) Notice: Subject to any disclaimer, the term of this patent is extended or adjusted under 35 U.S.C. 154(b) by 111 days.

(21) Appl. No.: 17/049,611

(22) PCT Filed: Feb. 4, 2019

(86) PCT No.: PCT/EP2019/052564
§ 371 (c)(1),
(2) Date: Oct. 22, 2020

(87) PCT Pub. No.: WO2019/206476
PCT Pub. Date: Oct. 31, 2019

(65) Prior Publication Data
US 2021/0239589 A1     Aug. 5, 2021

(30) Foreign Application Priority Data
Apr. 23, 2018   (LU) ..................... 100777

(51) Int. Cl.
*G01N 15/02*  (2006.01)
*G01N 15/14*  (2006.01)
(Continued)

(52) U.S. Cl.
CPC ..... *G01N 15/0227* (2013.01); *G01N 15/1434* (2013.01); *G01N 15/1463* (2013.01);
(Continued)

(58) Field of Classification Search
CPC .......... G01N 15/0227; G01N 15/1434; G01N 15/1463; G01N 21/645; G01N 2015/0065;
(Continued)

(56) References Cited

U.S. PATENT DOCUMENTS

| 4,573,796 A | * | 3/1986 | Martin ................ G01N 21/645 356/73 |
| 5,325,169 A | | 6/1994 | Nakamoto et al. |

(Continued)

FOREIGN PATENT DOCUMENTS

| DE | 202017003180 | 7/2017 |
| EP | 0421406 | 2/1996 |

(Continued)

OTHER PUBLICATIONS

Perozziello et al., "Microfluidic device for continuous single cells analysis via Raman spectroscopy enhanced by Integrated plasmonic nanodimers," Optics Express, 2016, vol. 24, No. 2.
(Continued)

*Primary Examiner* — Roy M Punnoose
(74) *Attorney, Agent, or Firm* — Hodgson Russ LLP (57) ABSTRACT

The invention relates to a method for examining a liquid which contains at least one cell and/or at least one particle using a first and a second measurement signal emanating from a liquid region, wherein the method has the following steps: (a) reading the first measurement signal and analysing the first measurement signal; and (b) determining based on the analysed first measurement signal (15) whether a detection of the second measurement signal (20) is carried out and a reading of the detected second measurement signal is completed, or whether a reading of the detected second
(Continued)

measurement signal (20) is completed, or whether a reading of the detected second measurement signal (20) is interrupted.

17 Claims, 6 Drawing Sheets

(51) Int. Cl.
  *G01N 21/64* (2006.01)
  *G02B 21/00* (2006.01)
  *G01N 15/00* (2006.01)
  *G01N 15/10* (2006.01)

(52) U.S. Cl.
  CPC ....... *G01N 21/645* (2013.01); *G02B 21/0076* (2013.01); *G01N 2015/0065* (2013.01); *G01N 2015/1006* (2013.01); *G01N 2015/144* (2013.01); *G01N 2015/1493* (2013.01)

(58) Field of Classification Search
  CPC ..... G01N 2015/1006; G01N 2015/144; G01N 2015/1493; G02B 21/0076
  See application file for complete search history.

(56) References Cited

U.S. PATENT DOCUMENTS

| | | |
|---|---|---|
| 11,112,346 B2 | 9/2021 | Schoendube et al. |
| 2013/0095469 A1 | 4/2013 | Koltay et al. |
| 2014/0309795 A1* | 10/2014 | Norton .................... G01F 1/661 700/282 |
| 2017/0350824 A1 | 12/2017 | Olsen et al. |
| 2017/0363534 A1 | 12/2017 | Schoendube et al. |
| 2021/0237049 A1* | 8/2021 | Schöndube ............. C12M 47/04 |
| 2021/0285861 A1* | 9/2021 | Hill .................... G01N 15/0227 |

FOREIGN PATENT DOCUMENTS

| | | |
|---|---|---|
| JP | H092077 | 1/1997 |
| JP | 2010516999 | 5/2010 |
| JP | 2015132622 | 7/2015 |
| JP | 2018010018 | 1/2018 |
| WO | 2015004917 | 1/2015 |
| WO | 2017220509 A1 | 12/2017 |

OTHER PUBLICATIONS

Li et al., "A simple and fast microfluidic approach of same-single-cell analysis (SASCA) for the study of multidrug resistance modulation in cancer cells," Lab on a Chip, 2011, vol. 11.
IPA, Office Action for AU Application No. 2019259309, dated Nov. 8, 2021.
ISDEC, Office Action for CA Application No. 3095848, dated Feb. 24, 2022.
IPOS, Office Action for SG Application No. 11202009611P, dated Feb. 24, 2022.
JPO, Office Action for JP Application No. 2020-557277, dated Feb. 16, 2022.
CNIPA, First Office Action for CN Application No. 201980025907.4, dated Mar. 2, 2022.
Larson B et al., "Brightfield and Fluorescence Imaging using 3D PrimeSurface Ultra-Low Attachment Microplates", Jan. 1, 2017, pp. 1-6, URL:https://www.biotek.com/assets/tech_resources/Brightfield%20and%20Fluorescent%20S-BIO%20Imaging%20App_Note.pdf.
None, "Durchflusszytometrie" ["Flow cytometry"], Wikipedia, Jan. 12, 2017, pp. 1-6, URL:https://de.wikipedia.org/wiki/Durchflusszytometrie.
Dahlberg Peter D et al, "A simple approach to spectrally resolved fluorescence and bright field microscopy over select regions of interest", Review of Scientific Instruments, Nov. 29, 2016, vol. 87, No. 11, pp. 113704-1-113704-6.
Chen Xucai et al, "Ultra-fast bright field and fluorescence imaging of the dynamics of micrometer-sized objects", Review of Scientific Instruments, Jun. 1, 2013, vol. 84, No. 6, pp. 063701-1-063701-13.

* cited by examiner

METHOD FOR EXAMINING A LIQUID WHICH CONTAINS AT LEAST ONE CELL AND/OR AT LEAST ONE PARTICLE

CROSS-REFERENCE TO RELATED APPLICATIONS

The present application is the U.S. national phase of International Application No. PCT/EP2019/052564 filed Feb. 4, 2019, which claims the benefit of and priority to Luxembourgian Patent Application No. 100777 filed Apr. 23, 2018, the entire disclosure of which is incorporated herein by reference.

FIELD

The disclosure relates to a method for examining a liquid which contains at least one cell and/or at least one particle. The disclosure also relates to a device for carrying out such a method.

BACKGROUND

It is known from the prior art that active substances, such as monoclonal antibodies and other proteins, are produced with the aid of so-called monoclonal cell lines. These are populations of cells that are all derived from a single mother cell. The production of monoclonal cell lines is necessary because this is the only way to ensure that all cells in the population have an approximately identical genome in order to produce the active substances with constant and reproducible quality.

In order to generate a monoclonal cell line, cells are transferred individually into containers of a microtitre plate. The cells to be transferred are produced by genetically modifying a host cell line and separating these modified cells. Individual cells are deposited in the microtitre plates, for example, by means of dispensing devices.

There is the requirement by the user that the dispensing process is carried out as quickly as possible. This is a requirement due to the fact that a large number of cells are processed in the laboratory each day. However, the user also has requirements that hinder the rapid processing of the cells. For example, the user has the requirement that, in the dispensing device, a storage location in the microtitre plate depends on the cell. In particular, for example, fluorescent cells should be placed in a different region of the microtitre plate than non-fluorescent cells.

The known dispensers cannot meet these requirements. For example, when determining fluorescent cells, a long exposure time must be selected so that usable fluorescence images can be generated. In practice, however, this time is often not available. In addition, due to the high exposure time, it is not possible to dispense a large number of cells. Shortening the exposure time, however, means that the fluorescence image is unusable or that, for example, the storage location cannot be determined exactly based on the fluorescence image. In this respect, automatic and quick dispensing cannot be implemented. Furthermore, long exposure times or repeated exposure lead to a fading of the fluorescent dye. It should therefore be ensured that each cell is illuminated only once, if possible, and then only for as long as necessary. Otherwise, the measurement results will be distorted.

In addition, in the known dispensing devices, small cells and/or almost transparent cells cannot be recognised, or can only be recognised with difficulty. Accordingly, no storage location can be determined automatically for such cells. There is therefore a risk that these cells will be lost during laboratory operations or have to be manually placed in the desired carrier.

SUMMARY

One object of the disclosure is to provide a method in which at least some of the disadvantages mentioned above do not occur.

The object is achieved by a method for examining a liquid, which contains at least one cell and/or at least one particle using a first and second measurement signal emanating from a liquid region, wherein the method comprises the following steps:
   a. reading the first measurement signal and analysing the first measurement signal and
   b. determining based on the analysed first measurement signal whether a detection of the second measurement signal is carried out and a reading of the detected second measurement signal is completed, or whether a reading of the detected second measurement signal is completed, or whether a reading of the detected second measurement signal (20) is interrupted.

The aforementioned method steps a and b are carried out in the order given.

In the method according to the disclosure, it was recognised that the examination of the liquid, in particular of the liquid region, can be carried out very quickly if two different measurement methods are used. In particular, a first measurement method can be used, resulting in the first measurement signal. The advantage of the first measurement method is that the first measurement signal can be read and/or analysed quickly. In contrast, more time is required for reading and/or analysing the second measurement signal resulting from a second measurement method than for reading and/or analysing the first measurement signal. However, as will be explained in more detail below, based on the second measurement signal, at least one property relevant to the user, in particular a physical or optical property, of the liquid and/or the cell and/or the particle in the liquid region can be determined precisely.

According to the disclosure, it was recognised that the dependency of the second measurement signal on the first measurement signal offers the advantage that the entire examination process can be carried out more quickly. Thus, the second measurement signal is not detected or the reading of the second measurement signal that has already started is cancelled if, when analysing the first measurement signal, it is found that there is no need for the detection and/or reading of the second measurement signal.

In the event that, after reading the information contained in the first measurement signal and analysing the first measurement signal, the examination of the liquid is not to be interrupted, the second measurement signal is detected and the reading of the information contained in the detected second measurement signal is completed. This means that the reading process of the second measurement signal is carried out completely.

Alternatively, the reading of the information contained in the second measurement signal that has already started can be completed. In this case, the second measurement signal may have been detected at the same time or at a different time from the first measurement signal, in particular before the analysis process of the first measurement signal has been terminated.

The liquid can be a cell suspension, which can promote the growth of the cells found in the liquid, and/or a particle suspension. The particle is a glass or polymer bead and/or has a size comparable to that of the cell.

The first measurement signal can be an optical signal. In particular, the first measurement signal can be a bright field light emanating from the liquid region. The second measurement signal can be an optical signal. In particular, the second measurement signal can be a fluorescent light emanating from the liquid region. The first measurement signal can result from a first optical measurement method which differs from a second optical measurement method from which the second measurement signal results. The respective optical measurement method can be a bright field method, a dark field method, a phase contrast method, a confocal method or a Raman spectroscopy method.

The liquid region is a region of the liquid from which the first and second measurement signals originate. The liquid region corresponds to a region that is viewed, in particular optically.

The automatic examination of the liquid means that the method steps are carried out using a computer and are therefore not carried out manually by the user.

In a particular embodiment, the first measurement signal can be analysed to determine whether at least one cell, in particular one single cell, and/or at least one particle, in particular one single particle, is arranged in the liquid region. In particular, the first measurement signal can be analysed as to whether a predetermined number of cells and/or particles is arranged in the liquid region.

The predetermined number can have the value of 0, so that no cells and/or no particles are arranged in the liquid region. Alternatively, the predetermined number can have a value greater than 0, in particular exactly 1. The predetermined number can be set by the user or automatically, in particular before the method is carried out.

A simple way of determining whether at least one, in particular exactly one single cell and/or at least one, in particular exactly one single particle is arranged in the liquid region can involve determining an optical property of the liquid region based on the detected first measurement signal. For example, by determining the contrast in the liquid region, it can be determined whether a cell and/or a particle is arranged in the liquid region. Of course, further optical properties of the liquid region can also be defined in order to determine whether at least one, in particular exactly one single cell and/or at least one, in particular exactly one single particle is arranged in the liquid region.

The detected first measurement signal can be used to generate a bright field image. In addition, to determine whether at least one, in particular exactly one single cell and/or at least one, in particular exactly one single particle is arranged in the liquid region, the optical property of the liquid region can be determined based on the bright field image.

This is advantageous because a bright field image can be generated very quickly. In this respect, it can be determined very quickly whether one, in particular exactly one single cell and/or one, in particular exactly one single particle is arranged in the liquid region and/or whether a predetermined number of cells and/or particles is arranged in the liquid region. In addition, the generation of bright field images offers the advantage that cells and/or particles can be easily detected. In addition, regions of the cell and/or particles that have no fluorescent substance can also be examined in bright field images. In bright field images, the cells and/or particles, in particular their properties, such as size and/or position and/or morphology and/or granularity and/or colour, can also be precisely determined.

The second measurement signal is not detected and therefore not read if no cells and/or no particles are arranged in the liquid region. In addition, the second measurement signal is not detected and therefore not read if the predetermined number of cells and/or particles is not arranged in the liquid region.

In addition, the reading of the second measurement signal that has already started can be interrupted if no cells and/or no particles are arranged in the liquid region. In addition, the reading of the second measurement signal that has started can be interrupted if the predetermined number of cells and/or particles is not arranged in the liquid region. As a result, depending on whether a cell and/or a particle is arranged in the liquid region and/or whether the predetermined number of cells and/or particles are arranged in the liquid region, a decision can be made as to whether the second measurement signal is detected and/or whether the already started analysis of the detected second measurement signal is completed. This is advantageous in that the presence of the at least one, in particular one single cell and/or the, in particular one single particle in the liquid region can be determined very quickly.

In a particular embodiment, the second measurement signal can be detected and read if at least one cell, in particular exactly one single cell, and/or at least one particle, in particular exactly one single particle, is arranged in the liquid region. This means that the second measurement signal is detected and completely read. For this purpose, an exposure time of a detection means can be adapted such that the detection means is exposed to the second measurement signal for a sufficient length of time such that certain properties of the cell and/or particles can be detected and/or images with high resolution can be generated based on the second measurement signal. In addition, the second measurement signal can be detected and/or read if the predetermined number of cells and/or particles is arranged in the liquid region.

The already started reading of the second measurement signal can be carried out completely if at least one, in particular exactly one single cell, and/or at least one, in particular exactly one single particle, is arranged in the liquid region. In addition, the already started reading of the second measurement signal can be carried out completely if the predetermined number of cells and/or particles is arranged in the liquid region.

The detected second measurement signal can be analysed, in particular to determine the property of the liquid and/or the cell and/or the particle located in the liquid region, to determine whether the liquid region does not fluoresce and/or whether a cell contained in the liquid region does not fluoresce and/or whether a particle contained in the liquid region does not fluoresce. In addition, the second measurement signal can be analysed to determine whether the liquid region fluoresces and/or whether a fluorescent cell and/or a fluorescent particle is contained in the liquid region.

As a result, by analysing the second measurement signal, the property of the cell and/or of the particle and/or of the liquid in the liquid region can be precisely determined in a simple manner. This is possible because, when determining whether the cell and/or the particle and/or the liquid fluoresces, the detection means is exposed to the fluorescent light emanating from the cell and/or the particle for a sufficiently long time. By increasing the exposure time of the detection means, fluorescence images with a high resolution and a high brightness spectrum can be obtained. This enables the fluorescent cell and/or the fluorescent particle and/or the fluorescent liquid to be precisely determined.

In a particular embodiment, the liquid region can be illuminated with a first illuminating light, whereupon the first measurement signal originates from the liquid region. In addition, the liquid region can be illuminated with a second illuminating light, whereupon the second measurement signal originates from the liquid region. The first illuminating light differs from the second illuminating light in at least one, in particular an optical, property. In particular, the first illuminating light differs from the second illuminating light in at least one of the following properties: wavelength, intensity, polarisation, collimation and/or alignment.

In one embodiment, the second illuminating light can be absorbed by the cell, in particular a fluorescent substance of the cell, and/or the particle, in particular a fluorescent substance of the particle, and thus excite the cell and/or the particle. In this case, the second measurement signal corresponds to the fluorescent light emitted by the cell, in particular the fluorescent substance in or on the cell, and/or the particle, in particular the fluorescent substance in or on the particle. The fluorescent substance can be present in certain regions of the cell and/or the particle.

After, in particular, a predetermined period of time, the liquid region can be illuminated again with the first illuminating light if no cells and/or no particles are arranged in the liquid region and/or if the predetermined number of cells and/or particles is not arranged in the liquid region. In the case of a dispenser, by means of which liquid, in particular a drop of liquid, can be dispensed, the liquid region can be re-illuminated with the first illuminating light after the liquid that has already been illuminated with a previous first illuminating light has been dispensed.

In addition, a detected further first measurement signal can be read and analysed after, in particular, a predetermined period of time if no cells and/or no particles are arranged in the liquid region and/or if the predetermined number of cells and/or particles is not arranged in the liquid region. The further first measurement signal results from re-illuminating the liquid region with the first illuminating light.

In addition, other first measurement signals, in particular in rapid succession, can be read and analysed several times in succession. This is possible because the respective time period for reading and analysing the first measurement signal is short. It is thus possible that the time period for performing at least two readout processes and analysis processes of the first measurement signal is shorter than the time period required for reading the second measurement signal.

The second illuminating light can only be emitted if at least one cell, in particular exactly one single cell, and/or at least one particle, in particular exactly one single particle, is arranged in the liquid region and/or if the predetermined number of cells in the liquid region and/or particles is arranged in the liquid region. This means that the second illuminating light is not emitted as long as no cells and/or no particles are arranged in the liquid region and/or as long as the number of cells and/or particles in the liquid region does not correspond to the predetermined number of cells and/or particles. This provides the advantage that, in the case of embodiments in which it is to be determined whether a fluorescent cell and/or a fluorescent particle is arranged in the liquid region, bleaching of the cell and/or the particle can at least be reduced in comparison to embodiments in which the cell and/or the particle is permanently illuminated with the second illuminating light.

In a particular embodiment, the liquid region can be illuminated simultaneously by the first illuminating light and the second illuminating light. This has the advantage that the analysis of the first measurement signal does not have to be awaited before the second illuminating light is emitted. Such a method provides the advantage that the property of the cell and/or the particle can be determined quickly. In addition, the liquid region can be illuminated with the second illuminating light while the first measurement signal is being analysed. In particular, the liquid region can be illuminated with the second illuminating light while determining whether a cell and/or a particle is arranged in the liquid region and/or whether the predetermined number of cells and/or particles is arranged in the liquid region. Thus, simultaneously, the liquid region can begin to be illuminated with the first illuminating light and the second illuminating light.

It can take longer to read the second measurement signal than to read the first measurement signal. This is particularly the case when the first measurement signal is the bright field light and the second measurement signal is the fluorescent light. Similarly, it can take longer to analyse the second measurement signal than to analyse the first measurement signal.

After the liquid has been examined, it can thus be known whether a predetermined number of fluorescent cells and/or fluorescent particles are arranged in the liquid region. It is preferred that a single fluorescent cell and/or a single fluorescent particle is arranged in the liquid region.

The above object is also achieved by a method for examining a liquid which contains at least one cell and/or at least one particle using a first and second measurement signal emanating from a liquid region, wherein
 a. the second measurement signal is read and analysed in order to determine whether at least one cell, in particular one single cell, and/or at least one particle, in particular one single particle, is arranged in the liquid region, and
 b. the first measurement signal is read and analysed in order to determine a property of the cell and/or the particle if a cell and/or a particle is arranged in the liquid region, wherein reading the second measurement signal takes longer than reading the first measurement signal and/or analysing the second measurement signal takes longer than analysing the first measurement signal.

The aforementioned method steps a and b are carried out in the order given.

The method according to the disclosure has the advantage that the presence of very small and/or almost transparent cells and/or particles can be determined in a simple manner. In particular, the method makes it possible to determine whether very small and/or almost transparent cells and/or particles are present in the liquid region.

The method according to the disclosure has the advantage that, by using two different optical measurement methods, the presence of at least one cell and/or a particle in the liquid region can be determined precisely on the one hand and a property of the cell and/or the particle can be determined in a simple manner on the other hand.

The first measurement signal can be an optical signal. In particular, the first measurement signal can be a bright field light emanating from the liquid region. The second measurement signal can be an optical signal. In particular, the second measurement signal can be a fluorescent light emanating from the liquid region. The first measurement signal can result from a first optical measurement method which differs from a second optical measurement method from which the second measurement signal results. The respective optical measurement method can be a bright field method, a dark field method, a phase contrast method, a confocal method or a Raman spectroscopy method.

The property of a cell and/or a particle to be determined by means of the method according to the disclosure can be a physical and/or optical property of the cell and/or the particle. For example, the property of the cell and/or the particle to be determined can be the morphology and/or granularity and/or transparency and/or size and/or colour of the cell and/or the particle.

The liquid region is a region of the liquid from which the first and second measurement signals originate. The liquid region corresponds to a region that is viewed, in particular optically.

The automatic examination of the liquid means that the method steps are carried out using a computer and are therefore not carried out manually by the user.

The first measurement signal can be read and analysed in order to determine a property of the cell and/or the particle if a predetermined number of cells and/or particles is arranged in the liquid region. The number can have the value of 0, so that no cells and/or no particles are in the liquid region. Alternatively, the number can have the value greater than 0, in particular exactly 1.

In a particular embodiment, after the information contained in the second measurement signal has been read, the second measurement signal can be analysed in order to determine the position of at least one, in particular one single cell, and/or at least one, in particular one single particle, in the liquid region. This provides the advantage that this region can be examined more precisely using the subsequent first measurement method. In particular, the information contained in the first measurement signal can be read and, based on the first measurement signal, in particular the information read from the first measurement signal, an image can be generated which has a high resolution of the section in which the cell and/or the particle are arranged. In addition, the analysis of the first measurement signal can take place more quickly because only the section of the liquid region containing the cell and/or the particle must be examined.

The second measurement signal can be analysed to determine whether a, in particular a single fluorescent cell, and/or a, in particular a single fluorescent particle, is arranged in the liquid region. In addition, the second measurement signal can be analysed as to whether a predetermined number of fluorescent cells and/or particles is arranged in the liquid region.

The second measurement signal can thus be used to generate a fluorescence image. The fluorescence image can be used to determine whether a, in particular single fluorescent cell, and/or a, in particular single fluorescent particle, is arranged in the liquid region. This makes it easy to determine whether at least one, in particular one single fluorescent cell, and/or one, in particular one single fluorescent particle, is arranged in the liquid region and/or whether the predetermined number of fluorescent cells and/or particles is arranged in the liquid region.

In a particular embodiment, the liquid region can be illuminated with a first illuminating light, whereupon the first measurement signal originates from the liquid region. In addition, the liquid region can be illuminated with a second illuminating light, whereupon the second measurement signal originates from the liquid region. The first illuminating light differs from the second illuminating light in at least one, in particular an optical, property. In particular, the first illuminating light differs from the second illuminating light in at least the following properties: wavelength, intensity, polarization, collimation and/or alignment.

In one embodiment, the second illuminating light can be absorbed by the cell, in particular a fluorescent substance of the cell, and/or the particle, in particular a fluorescent substance of the particle, and thus excite the cell and/or the particle. In this case, the second measurement signal corresponds to the fluorescent light emitted by the cell, in particular the fluorescent substance of the cell, and/or the particle, in particular the fluorescent substance of the particle.

In a particular embodiment, in particular after a predetermined period of time, the liquid region can be illuminated again with the second illuminating light if no cells and/or no particles are arranged in the liquid region and/or if the predetermined number of fluorescent cells and/or fluorescent particles is not arranged in the liquid region. In the case of a dispenser, by means of which liquid can be dispensed, the liquid region can be re-illuminated with the second illuminating light after the liquid that has already been illuminated with a previous second illuminating light has been dispensed.

In addition, a detected further second measurement signal can be read and analysed after, in particular, a predetermined period of time if no cells and/or no particles are arranged in the liquid region and/or if the predetermined number of fluorescent cells and/or fluorescent particles is not arranged in the liquid region. The further second measurement signal results from re-illuminating the liquid region with the second illuminating light. In addition, other second measurement signals, in particular in rapid succession, can be read and analysed several times in succession.

The illumination of the liquid region with the second illuminating light can be terminated if a, in particular a single, fluorescent cell and/or a, in particular a single, fluorescent particle is arranged in the liquid region and/or if the predetermined number of fluorescent cells and/or fluorescent particles is arranged in the liquid region. As a result, the cell and/or the particle is only exposed to the second illuminating light as long as necessary. This can at least slow down cell bleaching.

The first illuminating light can be emitted after it has been determined that a, in particular a single fluorescent cell, and/or a, in particular a single fluorescent particle, is arranged in the liquid region and/or after it has been determined that the predetermined number of fluorescent cells and/or fluorescent particles is arranged in the liquid region.

Accordingly, the first measurement signal can be read after it has been determined that a, in particular single, fluorescent cell and/or a, in particular only, fluorescent particle is arranged in the liquid region and/or after it has been determined that the predetermined number of fluorescent cells and/or fluorescent particles is arranged in the liquid region. This offers the advantage that the analysis process can run quickly because the position of the cell and/or the particle is already known and therefore only this part has to be analysed. In addition, based on the knowledge of the position of the cell and/or the particle, there is the possibility of optically detecting this region with particular precision.

The first measurement signal can be used to generate a bright field image. This offers the advantage that the bright field image can be generated quickly and thus the user can be quickly shown an image of the liquid region on a display device.

The first illuminating light can be emitted while determining whether a, in particular single fluorescent cell, and/or a, in particular single fluorescent particle, is arranged in the liquid region and/or while determining whether the predetermined number of fluorescent cells and/or fluorescent particles is arranged in the liquid region.

In both of the above-described methods for examining the liquid, the method steps mentioned below can be carried out.

The liquid, in particular the liquid region, can thus be arranged in a dispenser. The dispenser can dispense the liquid, in particular the liquid region. The liquid region may correspond to a region that has a volume that is dispensed by the dispenser by means of liquid dispensing. This means that by looking at the liquid region the user knows the number and/or type of cells and/or particles contained in the dispensed liquid. The liquid region can be arranged at least partially in a nozzle of the dispenser. The liquid to be dispensed can be dispensed into a container of a carrier. The carrier can have one or a plurality of containers. In particular, the carrier can be a microtitre plate with several containers.

Thus, a dispensing process can be controlled based on the first and/or second measurement signal. In particular, during the dispensing process, a storage location for the cell and/or the particle, the number of liquid drops to be dispensed, the dispensing time and the dispensing volume can be controlled based on the first and/or second measurement signal.

The liquid dispensing can be carried out according to a drop-on-demand method. With the drop-on-demand method, a single drop of liquid is dispensed at a selected time. In contrast, a continuous jet method emits a continuous jet of liquid, which disintegrates into individual drops after it emerges. The continuous jet method differs from the drop-on-demand method in that a separate control signal is not provided for each liquid drop and the individual liquid drops cannot be generated specifically at a selected point in time.

After determining a storage location, the liquid to be dispensed can be dispensed based on the first and/or second measurement signal. It can be dispensed into the container of the carrier. The storage location and/or the storage of the liquid in the container can thus be determined automatically. This means that the storage location is determined by a device described in more detail below, without it being influenced by the user.

The storage location of the liquid to be dispensed can depend on whether the cell and/or the particle fluoresces or not. Alternatively or additionally, the storage location can depend on the property of the cell and/or the particle, such as, the size, roundness, etc. of the cell and/or the particle. In addition, the storage location of the liquid to be dispensed can depend on the fluorescent light, in particular the intensity of the fluorescent light.

The carrier can have a plurality of containers. In this case, a container of the carrier can be intended for receiving a liquid which contains a, in particular single fluorescent cell, and/or a, in particular single fluorescent particle, and another container of the carrier can be intended for receiving a liquid which contains no fluorescent cells and/or no fluorescent particles. The liquid, which contains at least one, in particular one single fluorescent cell, and/or at least one, in particular one single fluorescent particle, can be supplied from the dispenser into the container and/or the liquid, which contains no fluorescent cells and/or no fluorescent particles, is supplied from the dispenser into another container.

In particular, the carrier can have a first group of containers, wherein the first group of containers is intended for the respective receiving of a liquid which contains a fluorescent cell and/or a fluorescent particle. In addition, the carrier can have a second group of containers, wherein the second group of containers is intended for the respective receiving of a liquid which contains no fluorescent cells and/or no fluorescent particles. The liquid, which contains at least one, in particular one single fluorescent cell, and/or at least one, in particular one single fluorescent particle, can be supplied from the dispenser into a container of the first group and/or the liquid, which contains no fluorescent cells and/or no fluorescent particles, is supplied from the dispenser into a container of the second group.

In addition, depending on the first measurement signal and/or the second measurement signal, the liquid to be dispensed can be supplied into a container of the carrier or into a reject container. Thus, the liquid can be supplied into the reject container if the predetermined number of cells and/or particles is not arranged in the liquid region. In particular, the liquid to be dispensed can be supplied into the reject container if no cells and/or no particles are arranged in the liquid region and/or more than one cell and/or more than one particle is arranged in the liquid region. The liquid region can contain the liquid to be dispensed during the dispensing process, so that viewing the liquid region makes it easy to decide whether the liquid is fed into the container or the reject container.

In a particular embodiment, the dispensing process, in particular the storage location, can additionally depend on whether a, in particular a single other cell and/or a, in particular a single other particle is arranged in another liquid region of the dispenser and/or whether a predetermined number of other cells and/or other particles is arranged in the other liquid region. Alternatively or additionally, the dispensing process, in particular the storage location, can depend on whether a, in particular a single other fluorescent cell and/or a, in particular a single other fluorescent particle is arranged in the liquid region of the dispenser and/or whether the predetermined number of other fluorescent cells and/or other fluorescent particles is arranged in the other liquid region. The other liquid region can be arranged upstream of the liquid region.

Taking into account the other liquid region provides the advantage that not only the number and/or type of cells and/or particles of the liquid to be dispensed in a next step is known, but also the number and/or type of cells in a liquid dispenser following the liquid dispensing. This provides the advantage that, for example, the liquids can be deposited efficiently in the carrier, in particular in the container of the carrier. In this way, the dispenser and/or the carrier can be moved into a position which is optimal with regard to the next liquid dispensing.

In a particular embodiment, the first measurement signal, in particular the bright field, can be used to generate a first image, in particular a bright field image. The second measurement signal, in particular the fluorescent light, can be used to generate a second image, in particular a fluorescence image. The two images can be compared. The position and/or the size of a fluorescent substance of the cell and/or of the particle can be determined in a simple manner by comparing the bright field image and the fluorescence image. Alternatively or additionally, the position of the cell and/or the particle can be determined in a simple manner by comparing the two images. This is particularly advantageous in embodiments in which it is first determined whether a fluorescent cell and/or a fluorescent particle is arranged in the liquid region.

After the liquid has been examined, it is known whether at least one cell, in particular with at least one specific property, is arranged in the liquid region and/or at least one particle, in particular with at least one specific property, is arranged in the liquid region. In addition, after examining the liquid, it is known whether the predetermined number of cells with at least one specific property and/or particles with at least one property are arranged in the liquid region.

Another object of the disclosure is to provide a device in which the disadvantages mentioned above do not occur.

The object can be achieved by a device for executing the method according to the disclosure, in particular for executing both methods according to the disclosure. The device can carry out both methods automatically.

The device comprises the dispenser for dispensing the liquid, which contains at least one cell and/or one particle, and an optical detection device. The dispenser can be a drop generator. This means that liquid drops can be dispensed through the dispenser. In addition, a liquid, in particular a drop of liquid, can be dispensed by the dispenser, having a volume between 10 nl (nanolitres) to 50 µl (microlitres).

The optical detection device has a first light source for radiating the first illuminating light for illuminating the at least one liquid region of the dispenser, a second light source for radiating the second illuminating light for illuminating the at least one liquid region of the dispenser, at least one detection means, at least one readout device and at least one analysis device.

The optical detection device can have a plurality of detection means, wherein a first detection means detects the first measurement signal and a second detection device detects the second measurement signal. Alternatively, the device can have a single detection means which detects both the first measurement signal and the second measurement signal. In this embodiment, a particularly compact optical detection device is implemented.

The optical detection device can also have a plurality of readout devices, wherein a first readout device reads the detected first measurement signal. A second readout device can read the detected second measurement signal.

In one mode of operation of the device, the analysis device can determine, based on the first measurement signal, whether at least one, in particular one single cell, and/or at least one, in particular one single particle, is arranged in the liquid region and/or whether the predetermined number of cells and/or particles are arranged in the liquid region. For this purpose, the analysis device can determine an optical property of the cell and/or of the particle and/or of the liquid located in the liquid region based on the detected first measurement signal. In addition, the analysis device can analyse the second measurement signal to determine whether the cell arranged in the liquid region and/or the particle arranged in the liquid region fluoresces or not. The dispensing process can be controlled based on the analysis result of the second measurement signal.

In an alternative mode of operation of the device, the analysis device can determine, based on the second measurement signal, whether at least one cell and/or at least one particle is arranged in the liquid region. In particular, the analysis device can analyse the second measurement signal to determine whether no fluorescent cells and/or no fluorescent particles are arranged in the liquid region or whether a single fluorescent cell and/or a single fluorescent particle is arranged in the liquid region or whether several fluorescent cells and/or several fluorescent particles are arranged in the liquid region. In addition, the analysis device can analyse the first measurement signal in order to determine a property of the cell and/or the particle if at least one, in particular a single, cell and/or at least one, in particular a single, particle is arranged in the liquid region. The dispensing process can be controlled based on the analysis result, in particular the specific property of the cell and/or the particle.

The device can have at least one, in particular exactly one single imaging device, for generating at least one image, in particular a bright field image and/or a fluorescence image. Alternatively, the device can have a plurality of imaging devices, wherein a first imaging device produces at least one first image, in particular a bright field image, and a second imaging device produces at least one second image, in particular a fluorescence image.

In a particular embodiment, the device can have a lens which is arranged in such a way that its optical axis runs transversely, in particular perpendicularly, to a dispensing direction of the liquid from the dispenser. This makes it possible to arrange the lens close to the dispenser, which is advantageous in terms of the resolution and the enlargement of the liquid region.

The device can also have a control device and a displacement device for moving the dispenser and/or the carrier. The control device can be electrically connected to the analysis device. The control device can control the displacement device based on the analysis result. In particular, the control device can control the displacement device in such a way that the displacement device moves the dispenser and/or the carrier into a position in which the liquid to be dispensed from the dispenser can be dispensed into, for example, the desired container of the carrier. The device can automatically determine the storage location of the liquid to be dispensed.

The dispensing device can have a deflection and/or suction device. The deflection device serves to deflect the dispensed liquid, in particular the dispensed drop of liquid. The suction device serves to suction away the dispensed liquid. The dispensed liquid can be deflected into a reject container and/or suctioned away. The deflection and/or suction can take place before the dispensed liquid enters the container, in particular the container of a microtitre plate. The liquid dispensed can be deflected and/or suctioned off if the liquid contains no cells and/or no particles. Alternatively, the dispensed liquid can be deflected and/or suctioned away if the number of cells and/or particles contained in the liquid is greater or less than a predetermined value, in particular greater than 1.

The first illuminating light and the first measurement signal can have a common beam path at least in parts. In addition, the second illuminating light and the second measurement signal can have a common beam path at least in parts. In addition, the first illuminating light and the second illuminating light can have a common beam path at least in parts. This makes it possible to implement a simply constructed optical detection device which has few components.

BRIEF DESCRIPTION OF THE DRAWING VIEWS

The subject matter of the disclosure is shown schematically in the figures, wherein the same elements or elements having the same effect are mostly provided with the same reference symbols. It can be seen that.

DETAILED DESCRIPTION

Figure 1:
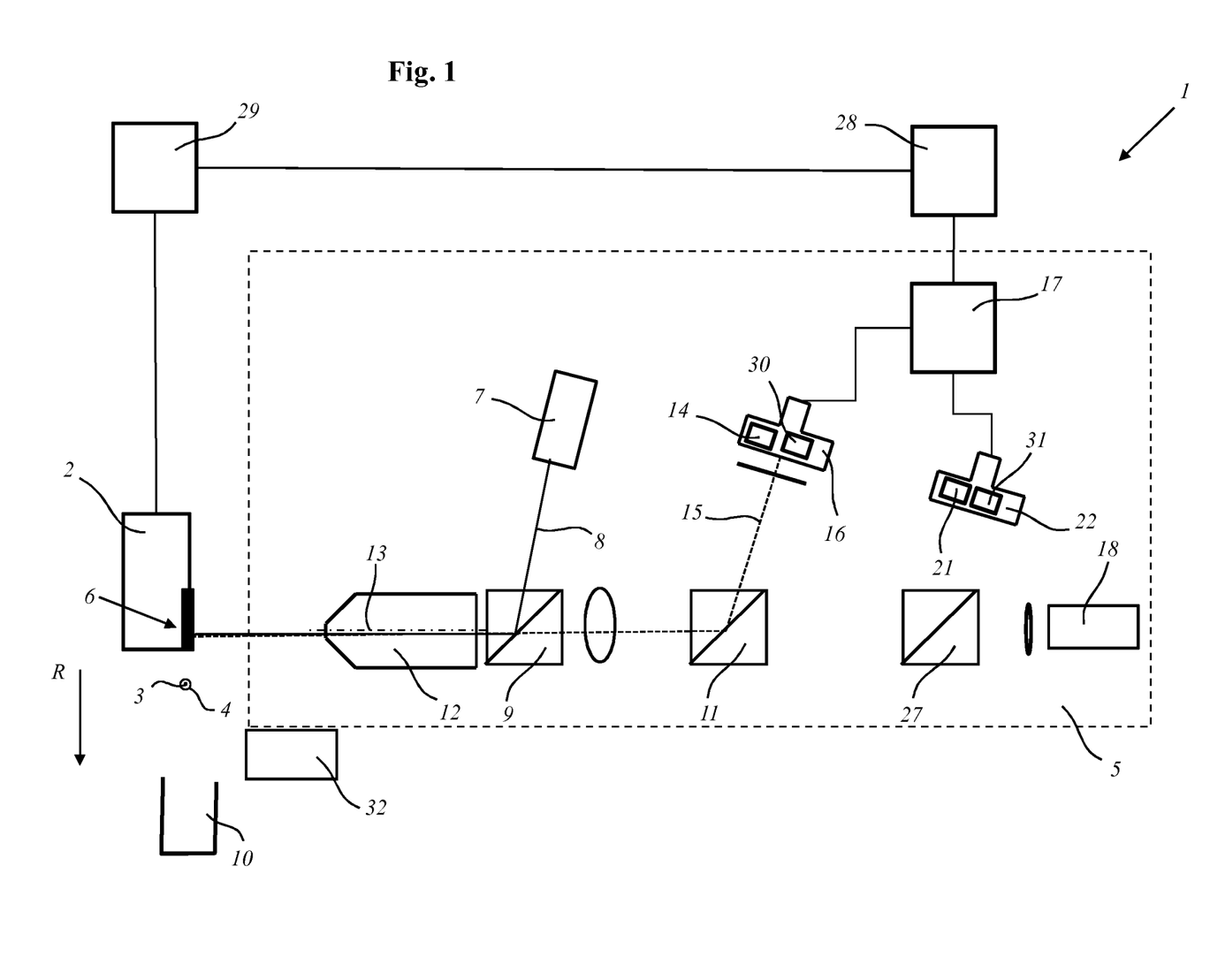
FIG. 1 shows a schematic illustration of a device according to the disclosure according to a first embodiment, in which a first light source emits a first illuminating light.

FIG. 1 shows a device 1 according to a first embodiment, which has a dispenser 2 for dispensing a liquid 4 containing at least one cell 3 and/or at least one particle, and an optical detection device 5 for optically detecting at least one liquid region 6 arranged in the dispenser 2. The dispenser 2 has a liquid reservoir (not shown in detail in FIG. 1) for receiving the liquid 4. The optical detection device 5 has a first light source 7, such as an LED light, for emitting a first illuminating light 8.

FIG. 1 shows a state in which only the first light source 7 emits the first illuminating light 8. In addition, FIG. 1 shows a state in which the dispenser 2 has dispensed a liquid 4, in particular a drop of liquid, which contains a cell 3. The liquid 4 is fed into a container of a carrier 10. The dispenser 2 is actuated to dispense the liquid 4 by an actuator (not shown) in particular a piezo actuator.

The optical detection device 5 also has a lens 12. The objective 12 is arranged in such a way that an optical axis 13 of the lens 12 runs perpendicular to a dispensing direction R of the liquid 4 from the dispenser 2. In addition, the optical detection device 5 has a first filter 9, which is arranged in the beam path of the first illuminating light 8 between the lens 12 and the first light source 7.

The first filter 9 is designed such that it deflects the first illuminating light 8 in the direction of the lens 12. In addition, the first filter 9 is designed such that it passes a first measurement signal 15 emanating from the liquid region 6 resulting from the first illuminating light 8 and shown with dashed lines in FIG. 1. The first measurement signal 15 can be a bright field light. The electrical measurement signal 15 passed through by the first filter 9 is deflected by a second filter 11 in the direction of a first imaging device 16. The first imaging device 16 can be a camera. The first measurement signal 15 and the first illuminating light 8 have a common beam path in parts.

A first detection means 14 arranged in the first imaging device 16 detects the first measurement signal 15. The first imaging device 16 can generate an image of the liquid region 6 based on the detected first measurement signal 15. In addition, a first readout device 30 is arranged in the first imaging device 16, by means of which the detected first measurement signal 15 can be read. In particular, the information contained in the first measurement signal 15 can be read.

The first imaging device 16 is electrically connected to an analysis device 17. The analysis device 17 analyses the first measurement signal 15 and/or the information read. Thus, the analysis device 17 can be part of a computer (not shown).

Figure 2:
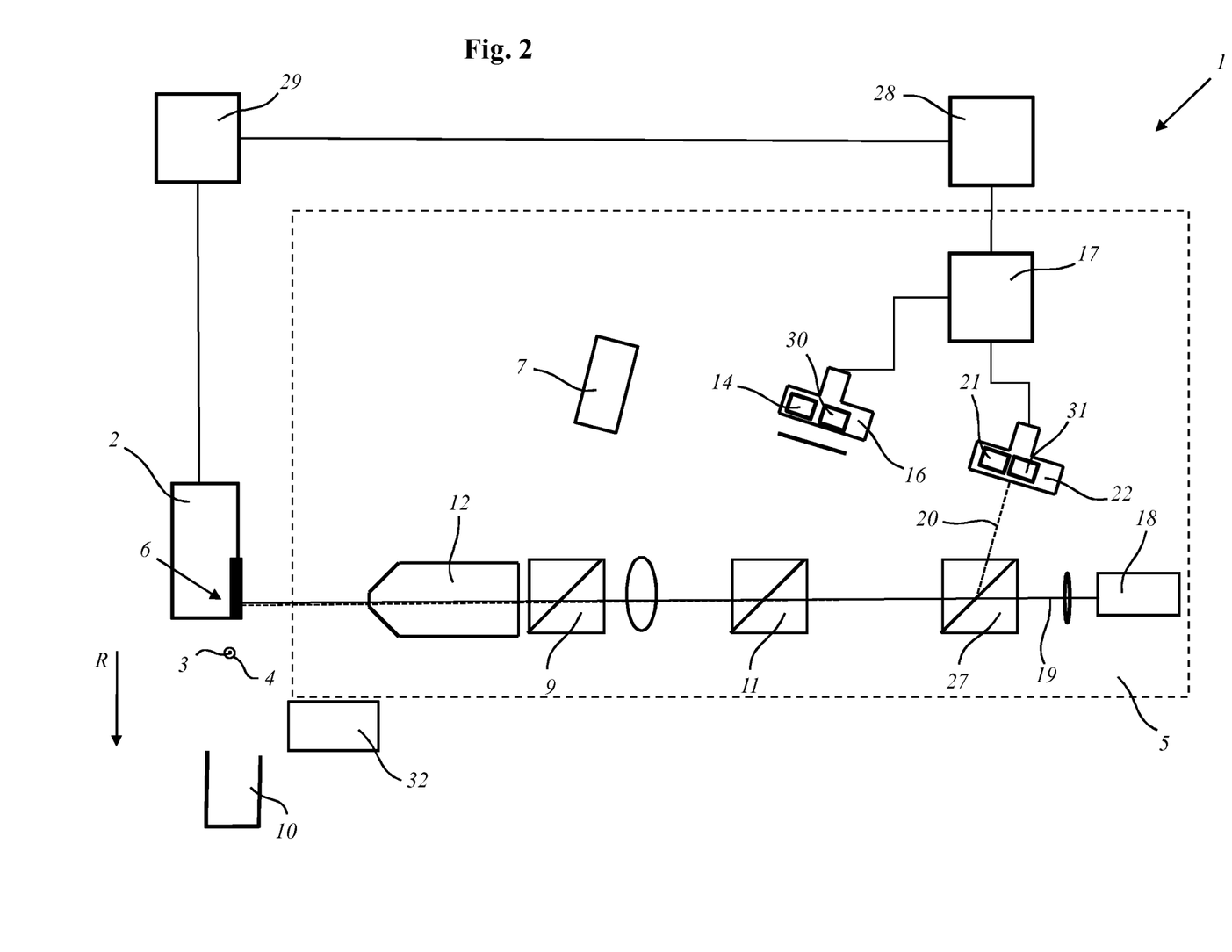
FIG. 2 shows a schematic illustration of the device according to the disclosure according to the first embodiment, in which a second light source emits a second illuminating light.

The optical detection device 5 also has a second light source 18 for emitting a second illuminating light 19 (shown in FIG. 2), a second imaging device 22 and a second detection means 21 for detecting a second measurement signal 20 shown in FIG. 2, which is arranged in the second imaging device 22. The second light source 18 may be a laser and the second imaging device 22 may be a camera.

In addition, a second readout device 31 is arranged in the second imaging device 22 and is used to read the detected second measurement signal 20. In particular, the information contained in the second measurement signal 20 can be read with the second readout device 31. The second imaging device 22 is electrically connected to the analysis device 17.

In addition, the optical detection device 5 has a beam deflector 27, which, as shown in FIG. 2, deflects the second measurement signal 20, which is shown with dashed lines, emanating from the liquid region 6 in the direction of the second imaging device 22.

The analysis device 17 is connected to a control device 28. The control device 28 controls the dispensing process of the dispenser 2 based on the analysis result of the analysis device 17. The control device 28 is electrically connected to a displacement device 29. The displacement device 29 can move the dispenser 2 and/or the carrier 10 in such a way that the liquid 4 can be dispensed to the desired storage location.

In addition, the control device 28 can control a deflection and/or suction device 32 of the dispensing device 1. Thus, the control device 28 can control the deflection and/or suction device 32 in such a way that the dispensed liquid 4 is deflected and/or suctioned away if no cells 3 and/or no particles are arranged in the liquid 4 or if several cells 3 and/or several particles are arranged in the liquid 4.

FIG. 2 shows a state of the device 1 shown in FIG. 1 according to the first embodiment, in which only the second light source 18 illuminates the liquid region 6. The second light source 18 emits the second illuminating light 19 for illuminating the liquid region 6 of the dispenser 2, which is passed through the beam deflector 27, the second filter 11 and the first filter 9 to the lens 12. Thus, the second illuminating light 19 and the first illuminating light 8 have a common beam path. In particular, both the first illuminating light 8 and the second illuminating light 19 are passed through the lens 12 to the liquid region 6.

The second measurement signal 20 emanating from the liquid region 6 as a result of the second illuminating light 19 is detected by the second detection means 21. The second readout device 31 can read the detected second measurement signal 20. The second measurement signal 20 can be fluorescent light emitted by the cell 3 and/or by the particle, provided that a cell 3 and/or a particle with fluorescence properties is arranged in the liquid region 6 of the dispenser 2. The second illuminating light 19 and the second measurement signal 20 have a common beam path in parts.

It is possible for the device 1 to be operated in such a way that the first light source 7 and the second light source 18 illuminate the liquid region 6, in particular at the same time or at different times.

Figure 3:
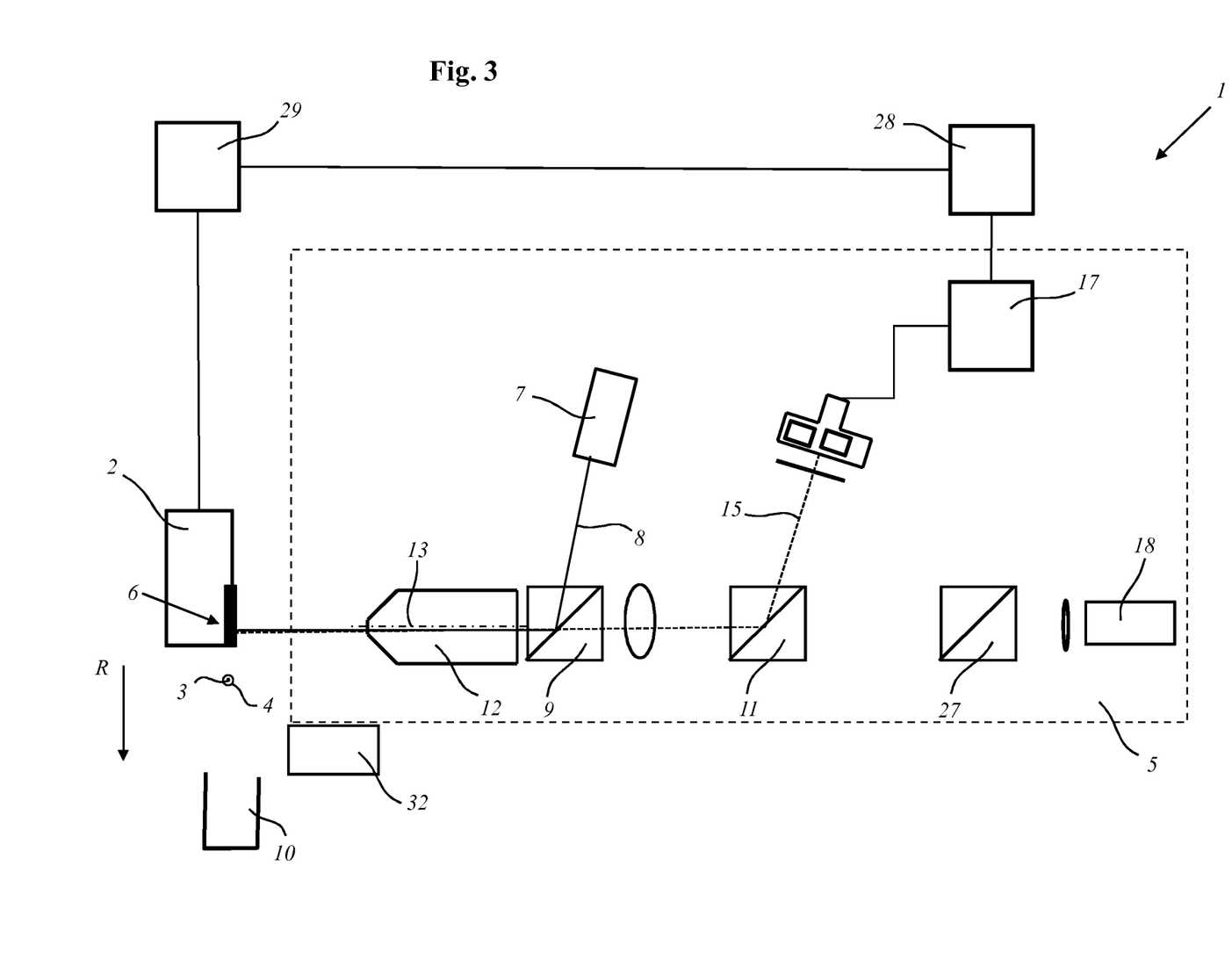
FIG. 3 shows a schematic illustration of a device according to the disclosure according to a second embodiment, in which the first light source emits the first illuminating light.

FIG. 3 shows a schematic illustration of a device according to the disclosure according to a second embodiment, in which the first light source 7 emits the first illuminating light 8.

The device differs from that in the device shown in FIGS. 1 and 2 in that it does not have two imaging devices, but rather a single imaging device. In addition, the device 1 has only a single detection means for detecting the first measurement signal 15 and the second measurement signal 20 (not shown in FIG. 3). In addition, the device 1 has only a single readout device for reading the detected first measurement signal 15 and the detected second measurement signal 20. The imaging device is electrically connected to the analysis device 17.

Figure 4:
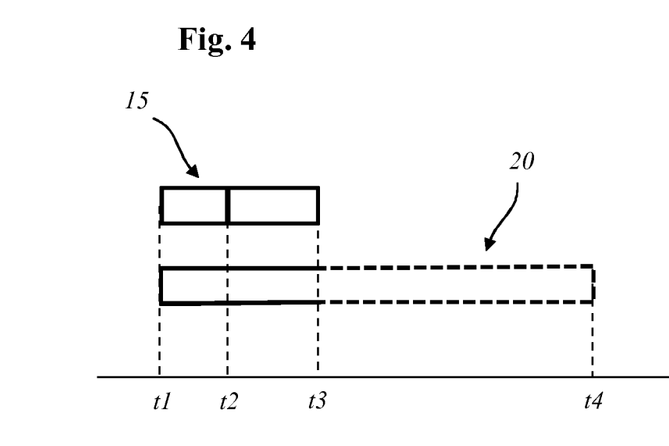
FIG. 4 shows a schematic illustration of a method according to the disclosure according to a first mode of operation for a state in which no cells and/or no particles are arranged in the liquid region.

FIG. 4 shows a schematic illustration of the method according to the disclosure according to a first mode of operation for a state in which no cells and/or no particles are arranged in the liquid region 6. In particular, FIG. 4 shows a readout time of the first measurement signal 15, an analysis time of the first measurement signal 15 and a readout time of the second measurement signal 20. The method described below can be carried out automatically by the device 1.

In the mode of operation shown in FIG. 4, the liquid region 6 is illuminated with both the first illuminating light 8 and the second illuminating light 19. The first detection means 14 first detects at a first point in time t1 the first measurement signal 15, which is, for example, a bright field light. The detected first measurement signal 15 is read, wherein the readout process is terminated at a second point in time t2.

The analysis device 17 analyses the detected first measurement signal 15, in particular the information read from the first measurement signal 15. In particular, the first measurement signal 15 is analysed as to whether a cell 3 and/or a particle is arranged in the liquid region 6 and/or whether a predetermined number of cells 3 and/or particles is arranged in the liquid region 6. The analysis process 17 is terminated at a third point in time t3.

Based on the first measurement signal 15, the first imaging device 16 generates an image, in particular a bright field image, which can be displayed by a display device (not shown in the figures). The user of the device 1 can thus quickly see whether a cell 3 and/or a particle is arranged in the liquid region 6.

The second detection means 21 first detects at the first point in time t1 the second measurement signal 20, which is, for example, a fluorescent light. The detected second measurement signal 20 is read, wherein, as shown by the dashed line, the readout process would last until a fourth point in time t4. It can be seen from FIG. 4 that the analysis of the second measurement signal 20 alone would take longer than the reading and analysis of the first measurement signal 15.

Since, in the case shown in FIG. 4, no cells 3 and/or no particles are arranged in the liquid region 6, the control device 28 causes the reading of the second measurement signal 20 to be interrupted at the third point in time t3. Likewise, the reading process would be interrupted at the third point in time t3 if the predetermined number of cells 3 and/or particles were not arranged in the liquid region 6.

The previously described detection, reading and analysis process of the first and second measurement signals 15, 20 can be repeated after a predetermined period of time and/or after a liquid has been dispensed, in particular the liquid region 6 has been dispensed from the dispenser 2, which is not shown in FIG. 4.

The control device 28 controls the dispensing process based on the first and/or second measurement signal 15, 20. Thus, the control device 28 can cause the displacement device 29 to move the dispenser 2 and/or the carrier 10 into a position in which the liquid to be dispensed is fed into a reject container. Alternatively or additionally, the control device 28 can control the deflection and/or suction device 32 in such a way that the dispensed liquid 4 is deflected and/or suctioned away into a reject container. The reject container is intended to hold liquid that contains no cells and/or particles and/or that does not contain the predetermined number of cells and/or particles. After moving the dispenser and/or the carrier 10 into the desired position, the liquid 4 is dispensed from the dispenser 2 into the container of the carrier 10.

Figure 5:
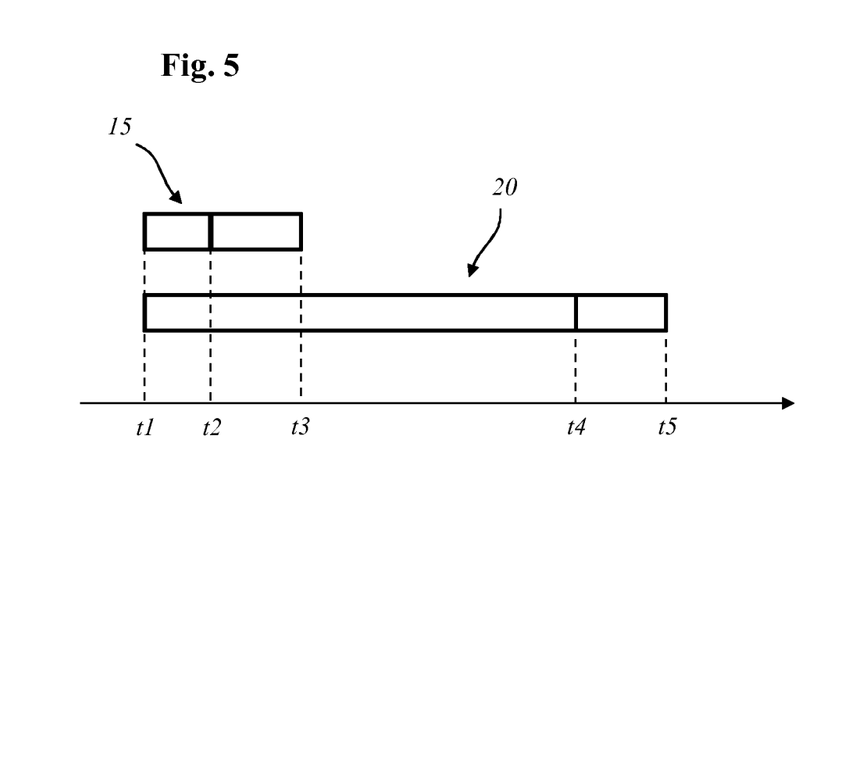
FIG. 5 shows a schematic illustration of the method according to the disclosure according to the first mode of operation for a state in which a cell and/or a particle is arranged in the liquid region.

FIG. 5 shows a schematic illustration of the method according to the disclosure according to a first mode of operation for a state in which a cell 3 and/or a particle is arranged in the liquid region 6 and/or a predetermined number of cells 3 and/or particles are arranged in the liquid region 6. Up to the third point in time t3, the process sequence corresponds to the process sequence shown in FIG. 4.

A difference to the method sequence shown in FIG. 4 is that, at the third point in time t4, the analysis device 17 determines that a cell 3 and/or a particle is arranged in the liquid region 6 and/or the number of cells and/or particles in the liquid region 6 corresponds to the predetermined number of cells and/or particles. Therefore, the second measurement signal 20 is completely read, wherein the reading is completed at the fourth point in time t4.

The analysis device 17 analyses the second measurement signal 20, in particular the read information, wherein, from the fourth point in time t4, the analysis is terminated at a fifth point in time t5. In particular, the analysis device 17 analyses the detected second measurement signal 20 to determine whether the cell 3 and/or the particle arranged in the liquid region 6 has a certain property, in particular whether the cell and/or the particle fluoresces. Based on the second measurement signal 20, the second imaging device 22 generates an image, in particular a fluorescence image, which can be displayed by a display device.

The control device 28 controls the dispensing process on the basis of the first and/or second measurement signal 15, 20. Thus, the dispenser 2 and/or the carrier 10 can, depending on a control command from the control device 28, be moved by a displacement device 29 into a position in which the one fluorescent cell and/or fluorescent particle can be introduced into a specific container of the carrier 10. After moving the dispenser 2 and/or the carrier 10 into the desired position, the liquid 4 is dispensed from the dispenser 2 into the container of the carrier 10.

A method according to a second mode of operation is described below with reference to FIG. 6. The method can be carried out automatically by the device 1.

In the method, as shown in FIG. 2, the liquid region 6 is first illuminated with the second illuminating light 19 and the second measurement signal 20 then emanating from the liquid region 6 is first detected at the first point in time t1. The reading of the detected first measurement signal 20 ends at a second point in time t2.

The analysis device 17 then analyses the detected second measurement signal 20, in particular the read information. In particular, the detected second measurement signal 20 is analysed as to whether at least one, in particular one single fluorescent cell 3 and/or at least one, in particular one single fluorescent particle, is arranged in the liquid region 6 and/or whether a predetermined number of fluorescent cells and/or fluorescent particles is arranged in the liquid region 6. The analysis is terminated at a third point in time t3. Based on the second measurement signal 20, the second imaging device 22 generates a fluorescence image that can be displayed by the display device.

If no fluorescent cells 3 and/or no fluorescent particles are arranged is arranged in the liquid region 6 and/or the number of cells and/or particles contained in the liquid region 6 does not correspond to the predetermined number, the process for examining the liquid is ended at the third point in time t3. The previously described detection, reading and analysis process of the second measurement signal 20 can be repeated after a predetermined period of time and/or after a liquid has been dispensed, in particular the liquid region 6 has been dispensed, which is not shown in FIG. 6.

Figure 6:
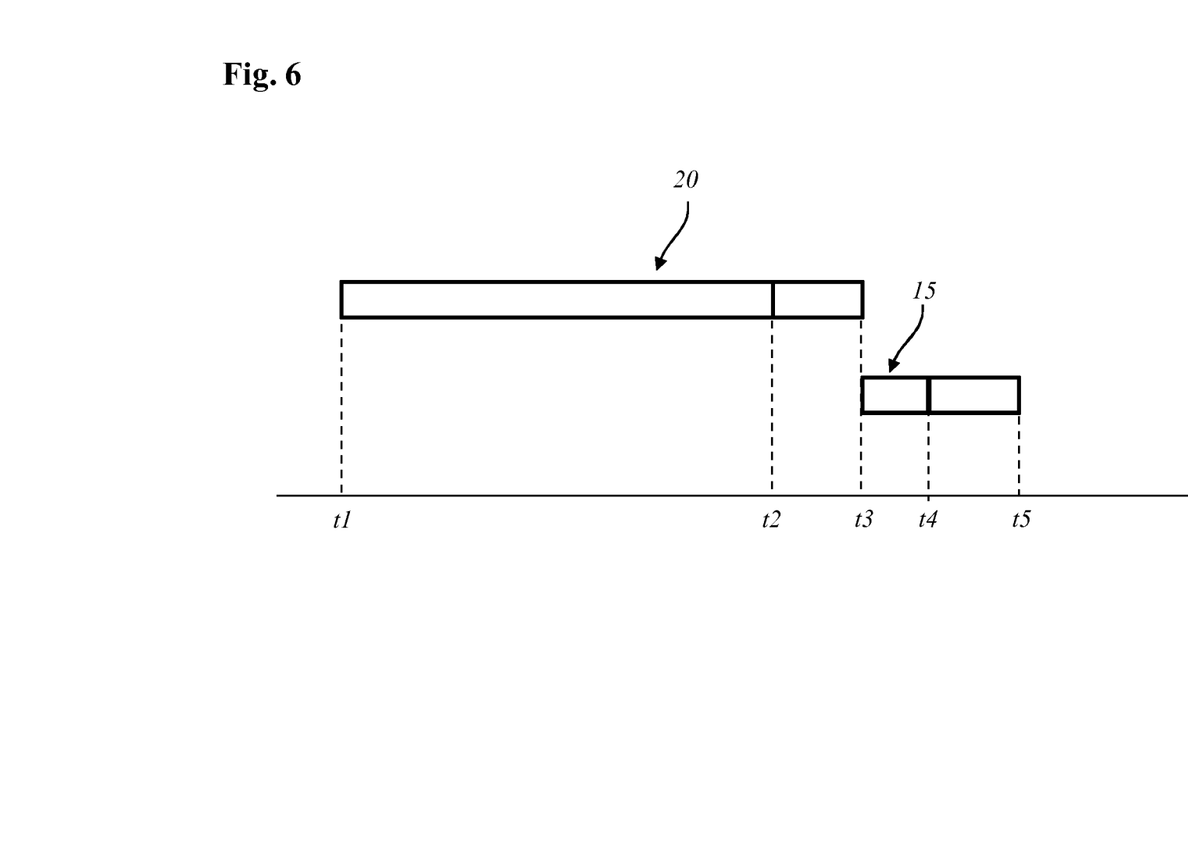
FIG. 6 shows a schematic illustration of a method according to the disclosure according to a second mode of operation.

FIG. 6 shows the case in which a cell 3 and/or a particle is arranged in the liquid region 6 and/or in which the number of cells 3 and/or particles arranged in the liquid region 6 corresponds to the predetermined number of cells and/or particles. The analysis device 17 thus determines the position of the cell 3 and/or of the particle in the liquid region 6 at the third point in time t3.

The first measurement signal 15 is detected for the first time at the third point in time t3, wherein the reading of the detected first measurement signal 15 is completed at the fourth point in time t4. Subsequently, the detected first measurement signal 15, in particular the read information, is analysed by the analysis device 17, which is completed at a fifth point in time t5. The analysis process is short because the position of the cell and/or the particle and therefore the region to be analysed is known.

The analysis device 17 determines a property of the cell and/or the particle, such as the size, roundness of the cell and/or the particle, etc. In addition, a bright field image can be generated by means of the first imaging device 16 based on the detected first measurement signal 15 and displayed by the display device.

The storage location of the liquid 4 to be dispensed can be determined based on the property of the cell 3 and/or the particle. The displacement device 29 can move the dispenser 2 and/or the carrier 10 into a corresponding position, so that the liquid 4 can be dispensed to the specific storage location.

LIST OF REFERENCE SYMBOLS

1 Device
2 Dispenser
3 Cell
4 Liquid
5 Optical detection device
6 Liquid region
7 First light source
8 First illuminating light
9 First filter
10 Carrier
11 Second filter
12 Lens
13 Optical axis
14 First detection means
15 First measurement signal
16 First imaging device
17 Analysis device
18 Second light source
19 Second illuminating light
20 Second measurement signal
21 Second detection means
22 Second imaging device
27 Beam deflector
28 Control device
29 Displacement device
30 First readout device
31 Second readout device
32 Deflection and/or suction device
R Dispensing direction
t1-t5 First to fifth moment

What is claimed is:

1. A method for automatically examining a liquid (4), the method comprising:
   illuminating a liquid region (6) of a liquid dispenser with a first illuminating light (8) to cause an optical first measurement (15) signal to emanate from the liquid region;
   detecting the optical first measurement signal (15) emanating from the liquid region using a camera;
   reading the optical first measurement signal (15) to provide an electrical first measurement signal representing a first image of the liquid region;
   analyzing the electrical first measurement signal by computer to determine whether a number of cells or particles in the liquid region corresponds to a predetermined number; and
   commencing or continuing to illuminate the liquid region of the liquid dispenser with a second illuminating light (19) only if the number of cells or particles in the liquid region corresponds to the predetermined number to thereby cause an optical second measurement signal (20) to emanate from the liquid region.

2. The method according to claim 1, wherein illuminating the liquid region of the liquid dispenser with the second illuminating light is commenced only if the number of cells or particles in the liquid region corresponds to the predetermined number, and wherein illuminating the liquid region of the liquid dispenser with the second illuminating light is not commenced if the number of cells or particles in the liquid region does not correspond to the predetermined number.

3. The method according to claim 2, further comprising:
   completing illuminating the liquid region of the liquid dispenser with the second illuminating light if illuminating the liquid region of the liquid dispenser with the second illuminating light was commenced; and
   reading the optical second measurement signal to provide an electrical second measurement signal representing a second image of the liquid region.

4. The method according to claim 3, further comprising:
   commencing reading the optical second measurement signal to provide an electrical second measurement signal representing a second image of the liquid region; and
   automatically terminating reading the optical second measurement signal before completion thereof if the step of analyzing the electrical first measurement signal determines that the number of cells or particles in the liquid region does not correspond to the predetermined number.

5. The method according to claim 3, wherein the electrical second measurement signal is analyzed to determine whether
   a. the liquid region (6) does not fluoresce and/or a cell (3) contained in the liquid region (6) does not fluoresce and/or a particle contained in the liquid region (6) does not fluoresce and/or whether
   b. the liquid region (6) fluoresces and/or a cell (3) contained in the liquid region (6) fluoresces and/or a particle contained in the liquid region fluoresces.

6. The method according to claim 5, further comprising:
   determining a storage location of the dispensed liquid depending on whether the liquid region fluoresces in response to being illuminated with the second illuminating light, wherein the storage location includes at least one first container for receiving the liquid which contains a fluorescent cell (3) and/or a fluorescent particle, and at least one second container for receiving the liquid which contains no fluorescent cells (3) and/or no fluorescent particles, and controlling the liquid dispenser based on the electrical first measurement signal and/or the electrical second measurement signal to dispense the liquid into the determined storage location corresponding to either the at least one first container or the at least one second container.

7. The method according to claim 1, wherein illuminating the liquid region of the liquid dispenser with the second illuminating light is commenced before the step of analyzing the electrical first measurement signal is completed, and wherein illuminating the liquid region of the liquid dispenser with the second illuminating light is continued only if the number of cells or particles in the liquid region corresponds to the predetermined number.

8. The method according to claim 7, wherein
the liquid region (6) is illuminated again with the first illuminating light (8) if the number of cells or particles in the liquid region does not correspond to the predetermined number and/or
the liquid region (6) is illuminated simultaneously by the first illuminating light (8) and the second illuminating light (19) and/or
simultaneously, the liquid region (6) begins to be illuminated with the first illuminating light (8) and the second illuminating light (19).

9. The method according to claim 1, wherein
a. the optical first measurement signal (15) is a bright field light, and
b. the optical second measurement signal (20) is a fluorescent light.

10. The method according to claim 9, wherein
a. the bright field light is used to generate a bright field image and
b. the fluorescent light is used to generate a fluorescence image.

11. The method according to claim 10, wherein
a. the bright field image and the fluorescence image are compared with one another and/or
b. the bright field image and the fluorescence image are compared with one another in order to determine the position of the cell and/or the particle and/or
c. the bright field image and the fluorescence image are compared with one another in order to determine the position and/or the size of a fluorescent substance of the cell and/or of the particle.

12. An optical detection device (5) for automatically examining a liquid (4) contained in a liquid region (6) of a liquid dispenser (2), the optical detection device (5) comprising:
a first light source (7) for emitting a first illuminating light (8) to illuminate the liquid region to cause an optical first measurement signal (15) to emanate from the liquid region;
a second light source (18) for emitting a second illuminating light (19) to illuminate the liquid region to cause an optical second measurement (20) signal to emanate from the liquid region;
at least one camera (16, 22) for detecting and reading the optical first measurement signal and the optical second measurement signal to provide an electrical first measurement signal representing a first image of the liquid region based on the optical first measurement signal and an electrical second measurement signal representing a second image of the liquid region based on the optical second measurement signal;
a computer (17) connected to the at least one camera for receiving the electrical first measurement signal and the electrical second measurement signal, wherein the computer is configured to:
analyze the electrical first measurement signal to determine whether a number of cells or particles in the liquid region corresponds to a predetermined number; and
cause the optical detection device to commence or continue to illuminate the liquid region of the liquid dispenser with the second illuminating light only if the number of cells or particles in the liquid region corresponds to the predetermined number to thereby cause the optical second measurement signal to emanate from the liquid region.

13. The optical detection device according to claim 12, wherein
the at least one camera comprises a first camera (16) for detecting and reading the optical first measurement signal to provide the electrical first measurement signal and a second camera (22) for detecting and reading the optical second measurement signal to provide the electrical second measurement signal.

14. The optical detection device according to claim 13, wherein the first camera produces at least one bright field image, and the second camera produces at least one fluorescence image.

15. The optical detection device according to claim 12, wherein the computer is configured to determine on the basis of the electrical second measurement signal whether or not one or more fluorescent cells and/or fluorescent particles are present in the liquid region.

16. A device (1) comprising:
a dispenser (2) including a liquid region (6) containing a liquid (4), the dispenser being operable to dispense the liquid from the liquid region;
an optical detection device (5) for automatically examining the liquid contained in the liquid region of the liquid dispenser, wherein the optical detection device comprises:
a first light source (7) for emitting a first illuminating light (8) to illuminate the liquid region to cause an optical first measurement signal (15) to emanate from the liquid region;
a second light source (18) for emitting a second illuminating light (19) to illuminate the liquid region to cause an optical second measurement signal (20) to emanate from the liquid region;
at least one camera (16, 22) for detecting and reading the optical first measurement signal and the optical second measurement signal to provide an electrical first measurement signal representing a first image of the liquid region based on the optical first measurement signal and an electrical second measurement signal representing a second image of the liquid region based on the optical second measurement signal;
a computer (17) connected to the at least one camera for receiving the electrical first measurement signal and the electrical second measurement signal, wherein the computer is configured to:
analyze the electrical first measurement signal to determine whether a number of cells or particles in the liquid region corresponds to a predetermined number; and cause the optical detection device to commence or continue to illuminate the liquid region of the liquid dispenser with the second illuminating light only if the number of cells or particles in the liquid region corresponds to the predetermined number to thereby cause the optical second measurement signal to emanate from the liquid region.

17. The device (1) according to claim 16, wherein
a. the optical detection device (5) has a lens (12) which is arranged such that an optical axis (13) of the lens is perpendicular to a dispensing direction (R) of the liquid (4) from the liquid region and/or
b. the device (1) has a control device (28) and a displacement device (29) for displacing the dispenser (2) and/or a carrier (10) for receiving the dispensed liquid (4), wherein the control device (28) is configured to control the displacement device (29) based on the electrical first measurement signal and/or the electrical second measurement signal and/or
c. a deflection device for deflecting the liquid dispensed from the dispenser and/or a suction device for suctioning away the liquid dispensed from said dispenser and/or
d. the first illuminating light (8) and the optical first measurement signal (15) have a common beam path at least in parts and/or
e. the second illuminating light (19) and the optical second measurement signal (20) have a common beam path at least in parts and/or
f. the first illuminating light (8) and the second illuminating light (19) have a common beam path at least in parts.

* * * * *